(No Model.)
R. COWEN.
APPARATUS FOR MANUFACTURING PNEUMATIC TIRES.
No. 583,428. Patented May 25, 1897.
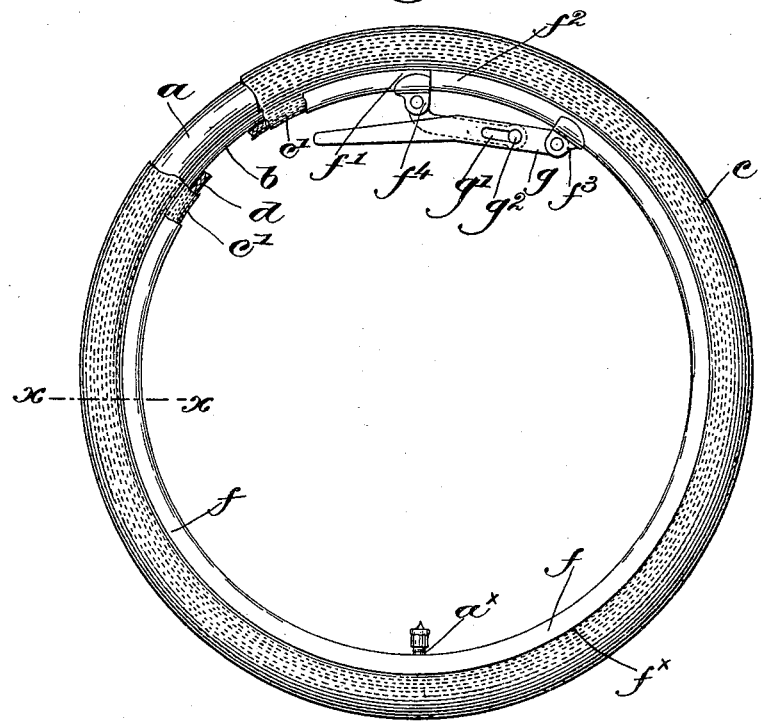
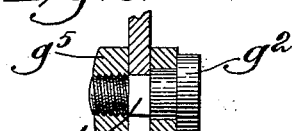
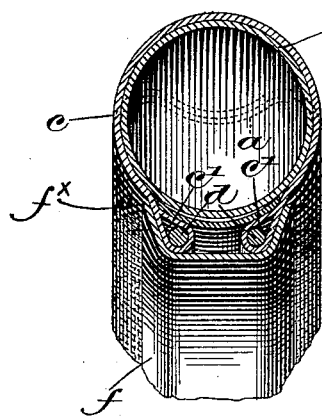
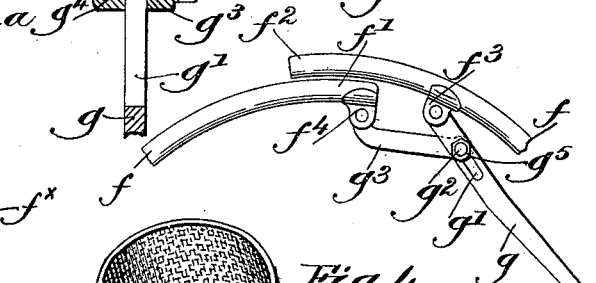
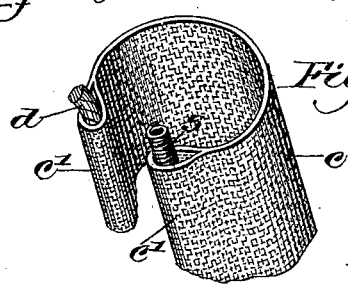
Witnesses:
A. C. Harmon
Edward F. Allen
Inventor:
Robert Cowen
by Crosby & Gregory attys.

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

APPARATUS FOR MANUFACTURING PNEUMATIC TIRES.

SPECIFICATION forming part of Letters Patent No. 583,428, dated May 25, 1897.

Application filed March 30, 1896. Serial No. 585,313. (No model.)

*To all whom it may concern:*

Be it known that I, ROBERT COWEN, of Cambridge, county of Middlesex, State of Massachusetts, have invented an Improvement in Apparatus for Manufacturing Pneumatic Tires, of which the following description, in connection with the accompanying drawings, is a specification, like letters on the drawings representing like parts.

This invention relates to the manufacture of pneumatic tires, and has for its object the production of simple and effective apparatus for carrying out such manufacture in a rapid, cheap, and convenient manner.

Heretofore it has been common in the manufacture of pneumatic tires to build up the endless unvulcanized tube, usually composed of alternate layers of rubber and fabric, and to place this tube in a mold, inflate it within the mold, and while inflated vulcanize it. Tires so produced are open to the objection that in the line of tread thereof a fin or crease is formed at the junction of the two parts of the mold, such fin or crease rendering the tire unduly stiff in use. Furthermore, the tread portion or surface of the tire so constructed is smooth, affording no efficient hold upon the ground, particularly in wet or muddy weather. In my effort to overcome these objectionable features and also to attain greater uniformity in product I invented a novel tire and method of making the same, wherein an endless tube of or containing unvulcanized rubber is arranged upon a suitable form, the tread-surface of the tube being covered by a suitable fabric, held or confined tightly upon the tube by winding one or more strips of binding fabric spirally about the tube, its form, and tread-covering fabric, after which the covered and confined tube is vulcanized in suitable manner.

This invention, both as to the process and product, forms the subject-matter of an application for United States Letters Patent, Serial No. 575,307, filed by me January 13, 1896, and now pending, the tire made in conformity with the said invention having a tread-surface provided with fine indentations, which prevent slipping, such indented appearance being due to the impress upon the tire of the surface of the tread-covering material. In practice, however, it has been found that while the process of manufacture set forth in said application is highly satisfactory in its results and the tire produced thereby is most effective and satisfactory the apparatus employed is objectionable, more particularly in the use of the spirally-wound binding or confining strip, which requires considerable time for its proper application to the covered tube and form and its subsequent removal therefrom.

I have accordingly devised a two-part vulcanizing-form for pneumatic-tire tubes comprising a rigid member and a flexible member to inclose the tire-tube and means to clamp said members together, the clamping means being rigidly and easily applied or removed, so that the vulcanizing step is greatly facilitated, such apparatus forming the subject-matter of this application.

As in my prior application referred to, I prefer to inflate the tire-tube above the atmospheric pressure during the process of vulcanization to thereby avoid any line or lines of weakness which will always be caused by the inflation of the tire in use to a condition differing from that in which it was manufactured. After the tire-tube has been inclosed in the form and the latter clamped such inflation is particularly desirable in order that the material of the tire-tube may be distinctly impressed into the meshes of the flexible member of the form for the purpose described.

Figure 1 of the drawings in side elevation shows a tire-tube inclosed within the vulcanizing-form and inflated, the tread-surface of the tube being covered with the flexible member of the form, broken out to show its arrangement and construction and with the retaining device in operative condition securing the two members of the form together. Fig. 2 is an enlarged transverse sectional view, on the line *x x*, of the parts in the condition shown in Fig. 1. Fig. 3 is a detail showing the adjacent ends of an expansible retaining device with one form of controlling means therefor. Fig. 4 is a section of a modified flexible form member, and Fig. 5 is an enlarged sectional detail of a part of the retaining device to be described.

Referring to Figs. 1 and 2, an endless tire-tube $a$, built up or formed in usual or desired manner of alternate layers of rubber and a fabric, as canvas or duck, in almost deflated condition is sprung over and upon the rigid member of the form, (shown as an annulus $b$,) preferably made of metal and concavo-convex in cross-section, the outer circumference of the member $b$, which has sufficient rigidity to sustain the tire-tube during vulcanization, being concaved to receive the tire-tube $a$.

The particular construction of the tire-tube and its mode of manufacture are not material to this invention, and for convenience I will hereinafter designate the tire-tube as a "rubber" tube.

The tube $a$ is provided with a suitable valve or plug $a^\times$, of usual construction, which is extended through an opening in the member $b$ of the form in order that the tube may be inflated at the proper time. After the tire-tube has been placed on the rigid member $b$ of the form the flexible member $c$ is applied thereto, covering the outer or tread surface of the tube, said flexible member being preferably a specially-woven endless piece of canvas or coarse duck of sufficient width to permit its edges to overlap the member $b$. This flexible member $c$ extends about the unvulcanized tube $a$, as shown in Fig. 1, and when the two members of the form are secured together inclosing the tube the surface of the flexible member will be impressed upon the soft unvulcanized-rubber tread-surface of the tube when the latter is inflated, forming a series of fine indentations therein. The edges of the flexible member $c$ are preferably thickened or enlarged in any suitable way to afford a hold for the retaining device, to be described, for securing the form members together.

One convenient way of forming the enlarged edges is shown in Figs. 1 and 2, wherein a pocket $c'$ is formed at each edge of the flexible member $c$ and a cord is inserted in each pocket, the cord, if of fibrous material, as shown at $d$, having sufficient stretch or elasticity in the direction of its length to permit the edges to be slipped over the rigid member $b$, as shown.

Instead of a cord of fibrous material a metallic cord may be used, the whole or a part of which is formed as a spiral spring $s$, Fig. 4, inclosed within each of the pockets $c'$.

Other means of forming the enlarged edge may be devised, obviously, the particular manner of forming such enlargement not being material so long as the enlargement is attained.

I have herein shown the two members of the form secured together by an expansible retaining device, which acts, when in operative condition, to engage the overlying edges of the flexible member $c$ and hold them securely in place upon the rigid member $b$ of the form. This retaining device is herein shown as a metal rim $f$, completely divided transversely to leave its two ends $f'$ $f^2$ movable toward or from each other as the rim is contracted or expanded, the rim being ring-like and somewhat trough-shaped in cross-section, as clearly shown in Fig. 2, to fit, when expanded, against the inner circumference of the form member $b$.

When the retaining device or clamp $f$ is expanded, its edges $f^\times$ bear against the flexible member $c$ of the form outside of its enlarged edges and the latter are inclosed between the convex surface of the member $b$ and the concave surface of the clamp $f$. As a result when the tire-tube is inflated to a suitable pressure, say of twenty to thirty pounds, the enlarged edges of the member $c$ are drawn tightly into the wedge-shaped spaces described, and the greater the inflation of the tire-tube the more tightly will the two members of the form be held together inclosing the tube. The tube $a$ is thus tightly pressed against the fabric of the flexible member $c$ to distinctly form fine indentations upon the tread of the tire-tube.

During vulcanization the air within the tube expands by reason of the heat, tending to burst the tube, and this tendency is simply and effectively resisted by the flexible member $c$ of the form, secured to its rigid coöperating member $b$, the tire-tube being vulcanized in inflated position substantially such as it assumes when in use upon the road.

In order to, quickly and effectively control the expansion and contraction of the retaining device $f$, I have provided simple means, shown as a lever $g$, pivoted to an ear $f^3$ on the inner circumference of and somewhat removed from the end $f^2$ of the split rim or ring $f$ and slotted at $g'$ to receive a stud $g^2$, pivotally mounted in one end of a link $g^3$, jointed at its other end to an ear $f^4$ on the inner side of the end $f'$ of the ring, said stud being squared at $g^4$, Fig. 5, to enter the slot $g'$ in the lever $g$, a nut $g^5$ holding the stud in adjusted position to accommodate slight variations in the circumference of the rigid member $b$ of the form. When the lever is swung into the position shown in Fig. 3, the ends $f'$ $f^2$ are moved to contract the ring $f$, so that it can be readily applied to or removed from the inner circumference of the rigid member $b$ of the form, but when applied thereto and the lever $g$ is swung to the left the ring $f$ will be expanded to tightly hug the overlying portions of the two members of the form, and when the lever $g$ is moved into the position shown in Fig. 1 the ring $f$ is locked in expanded position. The two members $b$ and $c$ are thus secured together with a uniform force throughout the extent of the ring $f$, and the diameter of the inflated tire-tube $a$ is maintained much truer than if held by the spiral wrapping described in my prior application.

It will be readily seen that the apparatus herein described may be readily and easily operated, so that very considerable time is saved in the operation of vulcanizing the tubes, as the winding and unwinding of the spiral wrapping or binding strip took time and care to apply or detach it.

As the flexible member of the form is nonadherent to the tire-tube it is readily removable therefrom when the vulcanization is completed and the tube deflated, the expansible ring $f$ having a hole therein for the admission of the tire-valve $a^\times$.

Other controlling mechanism may be employed for the expansible ring or clamp without departing from the spirit and scope of my invention.

Having fully described my invention, what I claim as new, and desire to secure by Letters Patent, is—

A vulcanizing-mold consisting of three members, to wit: a flexible outer member, and two substantially rigid inner members, the latter being adapted to retain the said outer member and thereby inclose the tube to be vulcanized, said two inner members having substantially the same width, and being formed to constitute between them an annular selvage-receiving chamber with opposite entrances between the overlying adjacent edges of said two members, and said outer member having enlarged selvage edges to enter the said opposite entrances of said selvage-receiving chamber and be securely held within said chamber, and means carried by one of the said two inner members to clamp the said two members together, substantially as described.

In testimony whereof I have signed my name to this specification in the presence of two subscribing witnesses.

ROBERT COWEN.

Witnesses:
M. W. WILLARD,
A. R. DURYEE.